US012346785B2

(12) United States Patent
Sghiouer

(10) Patent No.: US 12,346,785 B2
(45) Date of Patent: Jul. 1, 2025

(54) METHOD AND SYSTEM FOR SELECTING A LEARNING MODEL FROM AMONG A PLURALITY OF LEARNING MODELS

(71) Applicant: BULL SAS, Les Clayes-sous-Bois (FR)

(72) Inventor: Kaoutar Sghiouer, Compiegne (FR)

(73) Assignee: BULL SAS, Les Clayes-sous-Bois (FR)

( * ) Notice: Subject to any disclaimer, the term of this patent is extended or adjusted under 35 U.S.C. 154(b) by 1080 days.

(21) Appl. No.: 17/136,677

(22) Filed: Dec. 29, 2020

(65) Prior Publication Data

US 2021/0201209 A1      Jul. 1, 2021

(30) Foreign Application Priority Data

Dec. 31, 2019   (FR) ..................................... 1915812

(51) Int. Cl.
    *G06N 20/20*     (2019.01)
    *G06N 5/04*      (2023.01)

(52) U.S. Cl.
    CPC ............... *G06N 20/20* (2019.01); *G06N 5/04* (2013.01)

(58) Field of Classification Search
    CPC ............ G06N 5/04; G06N 5/01; G06N 20/00; G06N 3/08; G06N 3/0895; G06N 3/09; G06N 3/91; G06N 3/092; G06N 3/094; G06N 3/098; G06N 3/0985; G06N 5/00; G06N 3/02; G06N 20/20; G05B 13/00; G06F 11/3466; G06F 11/3495; G06F 11/36; G06F 11/3612; G06F 11/30; G06F 11/3409; G06F 11/3447; G06F 2212/175; G05D 1/80; G05D 1/86

See application file for complete search history.

(56) References Cited

U.S. PATENT DOCUMENTS

| | | | |
|---|---|---|---|
| 2016/0132787 A1* | 5/2016 | Drevo | G06N 20/10 706/12 |
| 2019/0258904 A1* | 8/2019 | Ma | G06F 18/24133 |
| 2019/0339688 A1* | 11/2019 | Cella | H04L 1/18 |
| 2019/0362222 A1* | 11/2019 | Chen | G06F 11/3476 |

OTHER PUBLICATIONS

Chatelain, et al. "A Multi-Model Selection Framework for Unknown and/or Evolutive Misclassification Cost Problems." Pattern Recognition. vol. 43., No. 3, pp. 815-823. Jul. 21, 2009.

(Continued)

*Primary Examiner* — Daniel T Pellett
(74) *Attorney, Agent, or Firm* — MEAGHER EMANUEL LAKS GOLDBERG & LIAO, LLP

(57) ABSTRACT

Techniques for selecting a learning model defined in particular by parameters and hyperparameters from among a plurality of learning models, implemented by a computing device and provided. A computing device may be provided includes a model selection module and a model repository including a plurality of series of instructions each corresponding to a learning model and each including hyperparameter values. The method may be provided that includes a step of selecting a model when the prediction performance value and the classification value are greater than a predetermined second threshold and the hyperparameter value is greater than a predefined threshold value.

13 Claims, 2 Drawing Sheets

(56) References Cited

OTHER PUBLICATIONS

Search Report issued in corresponding French application FR 1915812 dated Nov. 14, 2020, 2 pages.
European Search Report for corresponding EP Application No. 20218023, dated May 26, 2021.
Young et al., "HyperSpace: Distributed Bayesian Hyperparameter Optimization", 2018 30th International Symposium on Computer Architecture and High Performance Computing, , IEEE, pp. 339-347, Sep. 24, 2018.
Thornton et al., "Auto-WEKA: Combined selection and hyperparameter optimization of classification algorithms", KDD, pp. 847-855, 2013.

* cited by examiner

METHOD AND SYSTEM FOR SELECTING A LEARNING MODEL FROM AMONG A PLURALITY OF LEARNING MODELS

The invention relates to the field of data analysis, and more particularly to the selection of a model from among a plurality of models, which can be used in particular subsequently for advanced data modeling or exploitation phases. The invention relates to a method for selecting a model from among a plurality of models and a system for selecting a model from among a plurality of models. The invention also relates to a module for selecting a model from among a plurality of models.

PRIOR ART

With the expansion of activities related to Big Data, the Data Scientist business has grown significantly in recent years. This business, which aims at taking advantage of the large amounts of data available in companies and large organizations, is based on a variety of statistical techniques and computer tools, but remains largely "home-made" today. Each organization and each dataset pose specific problems to which Data Scientists try to respond with "tailor-made" solutions.

This is due in particular to the very great heterogeneity of the available data, their often incomplete nature and the errors and inconsistencies contained in almost all datasets of significant size. In order to take these aspects into account, Data Scientists, before entering into advanced data modeling and exploitation phases, must first go through a phase of preprocessing and preliminary analysis of the data (cleaning, exploratory analysis), but also the selection of a model that most faithfully represents the data. This step requires the experience of the Data Scientist in order to choose the best model, and is therefore biased by subjectivity and unreliability. Moreover, these tasks are extremely cumbersome and time-consuming. Thus, as highlighted in the study conducted by Forbes in 2016 and relayed in the article by G. PRESS, the Data Scientist spends 80% of his/her time on this process of data preprocessing and analysis and only 20% in pure algorithmics.

The model selection phase accounts for a considerable part of the work of Data Scientists, which today relies essentially on the non-automated and/or systematized implementation of different tools, and without a federating framework for an easy and relevant comparison of the results obtained on a dataset following the application of different analysis techniques, most often using estimates and predictions.

In 2011, the work of S. KANDEL et al. led to the development of the Wrangler tool, and then to the creation of the Trifacta company, which is developing a high performance preprocessing tool [KANDEL, 2011]. Nevertheless, this tool only makes it possible to facilitate textual type processing (use of regular expressions for example); to exploit data from databases (breakdowns, column groupings, etc.); to analyze messages syntactically.

It is in fact compared and evaluated in terms of time to the same processing carried out by Excel. Thus, it is only a tool for preprocessing raw data, but it is not able to perform statistics on the processed data. Precisely for this reason, the authors conclude in their perspectives that it is worthwhile to include other analytical techniques, including statistical techniques.

The open source program OpenRefine, developed by Google, is described in particular by R. Verborgh and M. De Wilde [VERBORGH, 2013]. However, it is a tool for processing unstructured data, in order to clean it and convert it from one format to another. Again, the tool does not perform any statistical analysis of the injected data.

The R language allows to perform statistical calculations and also to develop Machine Learning applications. It integrates numerous modules that allow the Data Scientist to easily perform this type of processing as well as preprocessing of data. It thus allows: data manipulation, via numerous data manipulation libraries; data visualization, a technique implemented in the ggplot2 tool for example presented by W. HADLEY [HADLEY, 2016]. This allows to build a set of geometric objects ("geoms") from a restricted dataset. However, there is no easy-to-use interface other than the programming language itself, which is fast and accessible, allowing any user, whether or not they are computer-literate, to implement supervised or unsupervised learning techniques.

Like the R language, the Python language is very widespread in the scientific world and has libraries dedicated to data analysis, notably: Pandas, which facilitates data manipulation, via adapted data structures and cleaning, formatting or other preprocessing operations [MCKINNEY, 2011]; Scikit-learn (sometimes abbreviated to sklearn), which provides different classification, regression and clustering algorithms for statistical analysis [PEDREGOSA, 2011].

However, depending on the values to be processed, the algorithms do not behave in the same way and this affects the result they output. When several estimation methods are a priori relevant, it is therefore not guaranteed that they provide the same result. From this point of view, it would seem useful to have methods or tools for selecting the best model when the algorithms are the most efficient.

As mentioned, machine learning is a major part of the fourth industrial revolution. Thus, industrial processes are more and more frequently improved through the integration of artificial intelligence or, more specifically, machine learning models capable of addressing technical problems as varied as there are industrial processes.

In particular, machine learning is based on a multitude of data that can come from several different sources and can therefore be highly heterogeneous. Thus, with the methods of the prior art, it is common for a team of data scientists to be trained in data processing and set up data processing processes. Nevertheless, when data sources are diverse and vary over time, the prior art methods are not reactive and can cause shutdowns of industrial processes. Indeed, when machine learning is used for industrial process control, a non-adapted preprocessing of this multitude of data sources can lead to a decrease in the responsiveness of control processes or worse a lack of sensitivity.

The overall conclusion is that there is a lack of tools capable of performing preprocessing tasks and analysis tasks in an automated/systematic manner. In fact, the tools of the prior art are limited to very basic data preprocessing (formatting, adding columns, etc.), without being concerned about the resulting analysis, making them time-consuming to use. It is therefore necessary to develop methods and systems that are less time-consuming than existing ones, simpler to use and automated and/or systematized, that can support a large amount of data as well as heterogeneous data. It is also necessary to develop a method and a system capable of selecting models with high reliability and performance, and the algorithms of which are the most efficient.

Indeed, there is a risk that a same dataset may be interpreted differently by several techniques, which then provide divergent results, as the degree of complexity of the analysis increases. This complexity of analysis may be due to: the volume of the dataset; samples from a same population that may be random or missing; contained errors or inconsistencies, the analysis methods used. It then becomes essential to be able to assess the relevance of the results provided by the analysis techniques following their application to the dataset.

However, in the context of the use of predictive models trained via learning techniques, the appearance of new variables or the modification of variables over time, not taken into account by the predictive model used, often makes the prediction model obsolete. Indeed, since the selected predictive model is based on probability laws that allow a dataset to be interpreted, the addition, deletion or change of variables, not taken into account by the prediction model, often requires a redesign of the prediction model, which is often time-consuming. A prediction model that is no longer suitable will therefore not be able to anticipate the appearance of anomalies, such as breakdowns or resource requirements in the context of predictive maintenance of IT infrastructures such as High Performance Computing systems. Considering data as outliers or characteristic of an anomaly in a dataset in connection with a misinterpretation of the dataset in the field of cyber security or more generally of surveillance is particularly important since it allows the detection of attacks or fraud.

However, no existing solution can directly ensure the quality and reliability of a model, without the expertise of a Data Scientist and allowing the automatic processing of datasets, particularly in the context of an application to industrial processes. Similarly, at present, there is no solution that automatically provides the user with the most appropriate implemented method to interpret the dataset and correlate the variables. It is therefore up to the user to analyze all the results provided by the different methods in order to draw conclusions and choose the model that seems to correspond most closely to the dataset under study.

Finally, the solutions of the state of the art are not very accessible, following a "black box" logic. They are primarily intended for Data Science experts, either: for carrying out all the preprocessing steps, or for interpreting/understanding the results obtained following correlation tests. The tools therefore do not explain to the user why the correlation between an analytical method and a dataset has succeeded or failed. In addition, some tools require knowledge/mastery of programming and computer languages to be manipulated.

Technical Problem

The invention therefore aims to overcome the disadvantages of the prior art. In particular, the invention aims at providing a method for selecting a model, said method being fast and simple to implement, with a reduced number of steps, allowing the reliability, performance and relevance of the selected model to be controlled while being simple to use. Moreover, such a method is automated and systematized allowing easy application to any industrial process. The method is also accessible to any user while being able to support a large amount of data, which may be heterogeneous. Moreover, it is particularly suitable for the monitoring of industrial processes and more particularly of information systems.

The invention further aims at providing a system for selecting a model, said system being simple and fast to use. In addition, the system according to the invention is accessible and capable of processing a large volume of data. The system according to the invention also allows the reliability, performance and relevance of the selected model to be controlled.

BRIEF DESCRIPTION OF THE INVENTION

For this purpose, the invention relates to a method for selecting a learning model defined in particular by parameters and hyperparameters from among a plurality of learning models, implemented by a computing device, said computing device comprising a model selection module and a model repository including a plurality of series of instructions each corresponding to a learning model and each including hyperparameter values, said method comprising:
 a step of evaluating the prediction performance of each learning model, by prediction performance indicators,
 an evaluation processing including a step of evaluating a classification, by the model selection module, for providing, for each learning model, at least one classification value,
 a step of selecting a model, the performance value and classification value of which are greater than first predetermined threshold values,
 a step of varying the hyperparameter values, from hyperparameter optimization indicators,
 a step of selecting a model when the prediction performance value and the classification value are greater than predetermined second threshold values and the hyperparameter value is greater than a predetermined threshold value.

In other words, the invention relates to a method for selecting a model defined in particular by parameters and hyperparameters, implemented by a computing resource such as a computer, said method comprising a plurality of models, hyperparameter values, said values being predefined before a learning process, parameter values, said values being calculated during learning, by a model selection module, said method comprising:
 a step of evaluating the prediction performance of each model of the plurality of models, by prediction performance indicators,
 a step of evaluating a classification, by a classifier, for providing at least one classification value,
 a step of selecting a model, the performance value and classification value of which are higher than first predetermined threshold values,
 a step of varying the hyperparameter values, from hyperparameter optimization indicators, and
 a step of selecting a model when the prediction performance value and the classification value are greater than predetermined second threshold values and the hyperparameter value is greater than a predetermined threshold value.

According to other optional features of the method, the latter may optionally include one or more of the following features, alone or in combination:
 the step of varying the hyperparameter values is implemented when the hyperparameter value is below the predefined threshold value, said step of varying the hyperparameter values comprising the implementation of:
  a hyperparametric optimization by parameter grid search or sweep, or
  a hyperparametric optimization by random search, or
  a sequential model-based optimization.
 the step of varying the hyperparameter values is implemented when the hyperparameter value is lower than the predefined threshold value, said step of varying the hyperparameter values comprising a sequential model-based optimization, said sequential model-based optimization comprises implementing a Bayesian algorithm including:
  a step of defining a search space,
  a step of optimizing the search space comprising characterizing each data item of the search space by values,
  a step of associating with each data item of the optimized search space an optimum value according to an acquisition function,
  a step of determining an optimum data item for which the acquisition function is maximized,
  the calculation of a new data item from the optimum data item and the maximized acquisition function,
  a step of implementing the optimized search space comprising the newly calculated data,
  the selection of the optimized values of the parameter values associated with each transformation function as a function of the optimized data when the search space is implemented.
it comprises a step of simultaneously comparing the analysis results of the different models.
it further comprises a step of electing the best algorithm and submitting it to the user.
the evaluation processing further comprises a step of evaluating the classifier for generating a reliability indicator.
it comprises a step of automatically generating models for the problem under study. This allows a new model to be generated if the prediction performance falls below a predetermined threshold and in particular if the nature of the dataset changes without human intervention.
the parameters are defined from a dataset issued by data providers having industrial production sensors and the selected learning model is trained for monitoring an industrial process.
the industrial production sensors include: connected objects, machine sensors, environmental sensors and/or computer probes.
the industrial process is selected from: an agri-food production process, a manufacturing production process, a chemical synthesis process, a packaging process or a process for monitoring an IT infrastructure.
industrial process monitoring corresponds to industrial process security monitoring and includes in particular predictive maintenance, failure detection, fraud detection, and/or cyber-attack detection.

The invention, furthermore, relates to a system for selecting a learning model defined in particular by parameters and hyperparameters from among a plurality of learning models, said system comprising a plurality of models, hyperparameter values, said values being predefined before a learning process, parameter values, said values being calculated during learning, said system comprising a computing device including a model selection module and a model repository including a plurality of series of instruction each corresponding to a learning model and each including hyperparameter values, said device being configured to:
  evaluate the prediction performance of each learning model, by prediction performance indicators,
  evaluate the classification, by the model selection module, and provide, for each learning model, at least one classification value,
  select a model, the performance value and classification value of which are higher than first predetermined threshold values,
  vary the hyperparameter values, from hyperparameter optimization indicators,
  select a model when the prediction performance value and the classification value are greater than predetermined second threshold values and the hyperparameter value is greater than a predetermined threshold value.

The invention further relates to a module for selecting a model defined in particular by parameters and hyperparameters, implemented by a computing device, said module comprising a model repository including a plurality of series of instructions each corresponding to a learning model and each including hyperparameter values, said values being predefined before a learning process, parameter values, said values being calculated during learning, said model selection module being configured to:
  evaluate the prediction performance of each learning model, by prediction performance indicators,
  evaluate the classification, and provide, for each learning model, at least one classification value,
  select a model, the performance value and classification value of which are higher than first predetermined threshold values,
  vary the hyperparameter values, from hyperparameter optimization indicators,
  select a model when the prediction performance value and the classification value are greater than predetermined second threshold values and the hyperparameter value is greater than a predetermined threshold value.

The invention further relates to a model selection program comprising instructions which, when implemented by a computing device, cause a method for selecting a learning model according to the invention to be implemented.

The invention further relates to a recording medium on which the data processing program according to the invention is recorded.

Other advantages and features of the invention will appear upon reading the following description given by way of illustrative and non-limiting example, with reference to the appended figures.

DESCRIPTION OF THE INVENTION

Figure 1:
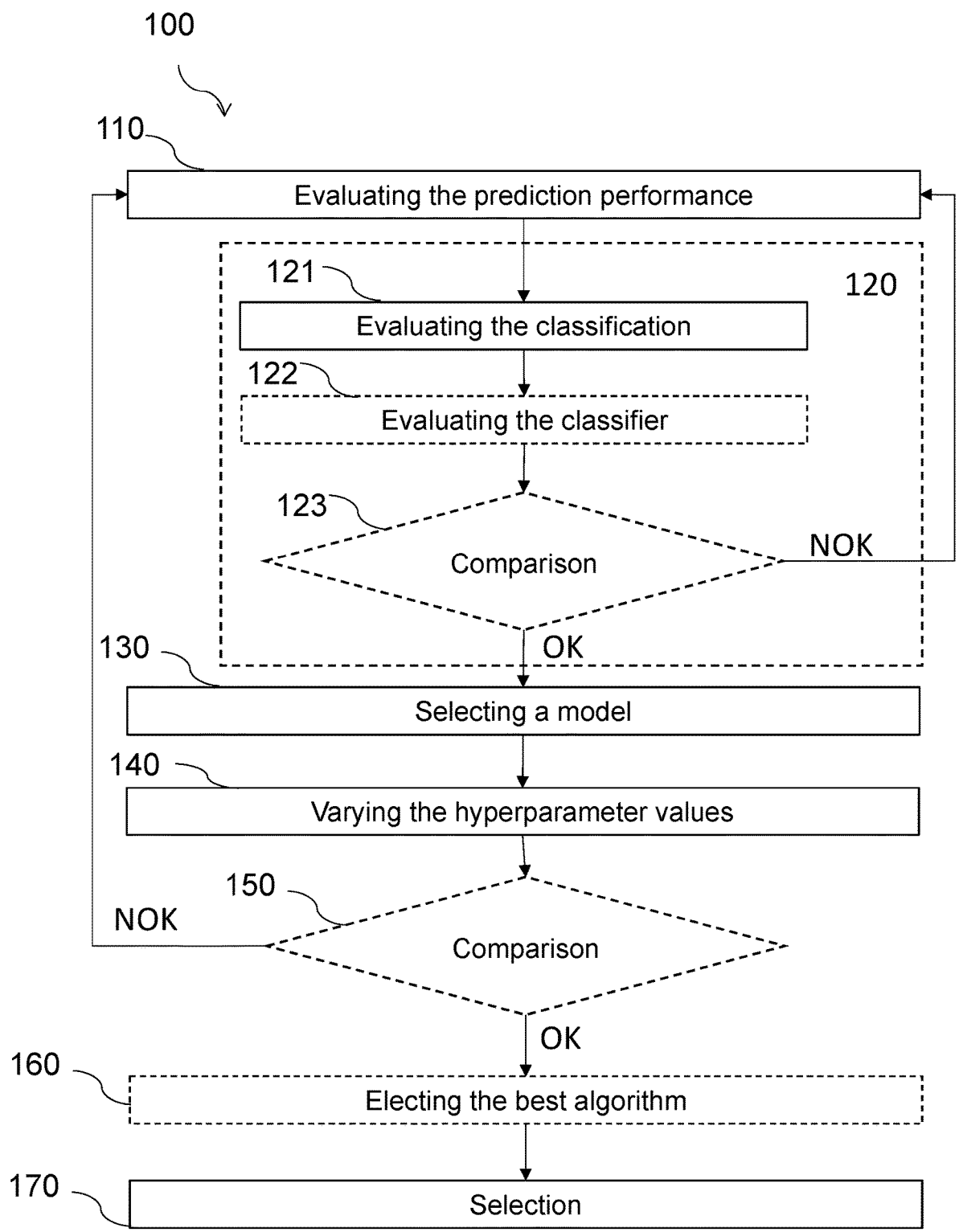
FIG. 1 shows a diagram of an embodiment of the method according to the invention.
Figure 2:
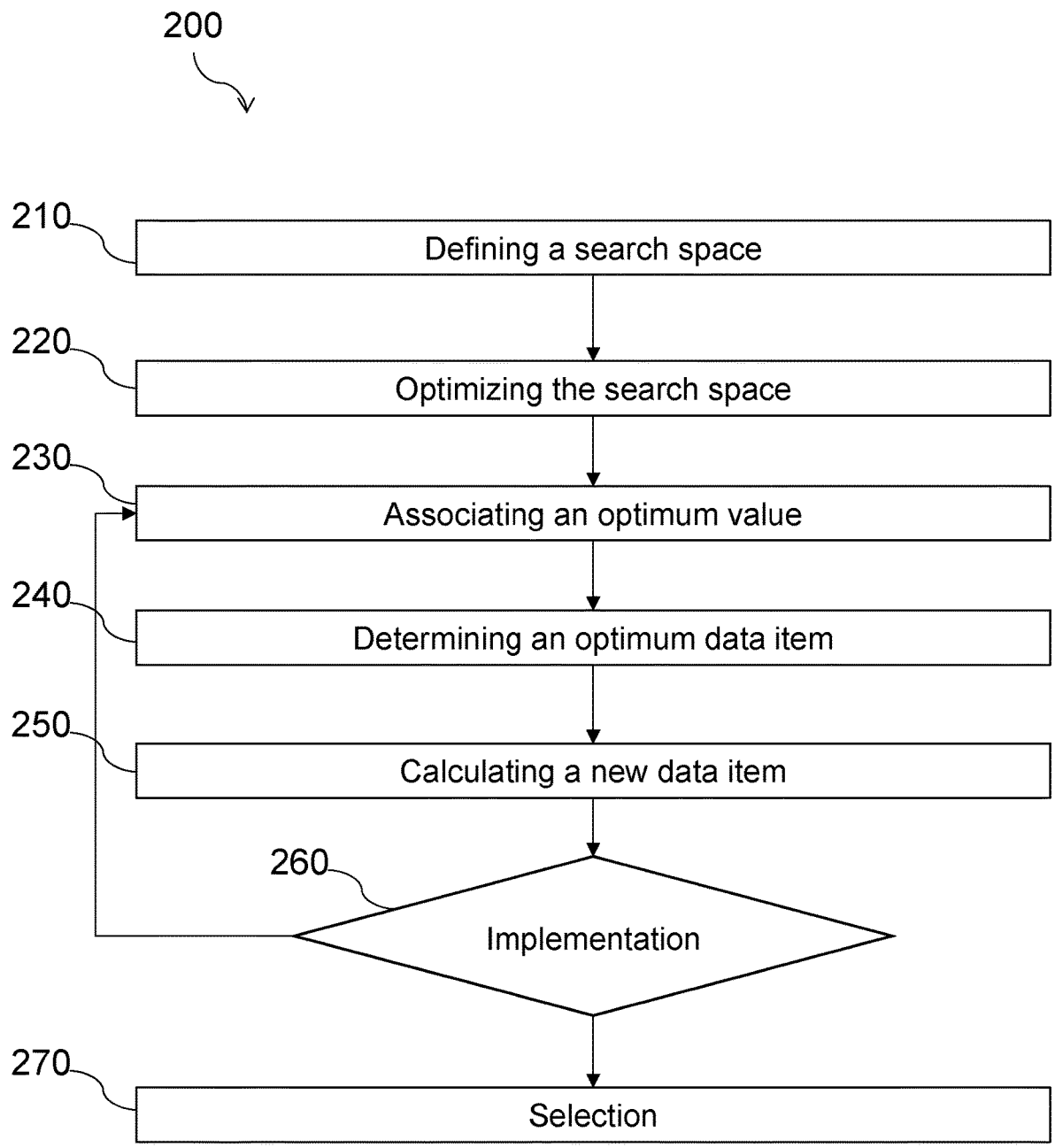
FIG. 2 shows a diagram of a sequential model-based optimization of an embodiment of the method according to the invention.

The term "model" or "rule" or "algorithm" or "machine learning model", within the meaning of the invention, may, for example, correspond to a finite sequence of operations or instructions for calculating a value by classifying or partitioning the data within predefined groups Y and for assigning a score or ranking one or more data within a classification. The implementation of this finite sequence of operations allows, for example, to assign a label Y to an observation described by a set of characteristics or parameters X, using for example the implementation of a function f likely to reproduce Y, having observed X. $Y=f(X)+e$ where e symbolizes noise or measurement error.

By "predetermined threshold" is meant, within the meaning of the invention, a parameter maximum value associated with each resource allowing proper operation of said resource. For example, this corresponds to the maximum acceptable resource consumption limits for an IT infrastructure hosting one or more application bricks. These limits may be real or hypothetical and generally correspond to a level of use beyond which malfunctions may occur and result in a shutdown of the resource, the IT infrastructure or at least reductions in quality of service.

By "execution rules" is meant, within the meaning of the invention, predetermined parameters for the execution of a scheduling plan, compliance with which allows execution that meets the needs of the IS administrator. These rules may, in particular, include chaining orders to be respected, schedules to be respected, resource consumption thresholds to be respected, predetermined functions to be used.

By "variable" is meant, within the meaning of the invention, a characteristic of a statistical unit which is observed and for which a numerical value or a category of a classification can be assigned.

By "selection techniques" is meant, within the meaning of the invention, a finite sequence of operations or instructions allowing a value to be calculated via statistical tests such as the ANOVE test, the test of mutual information between two random variables, the $Chi^2$ test, regression tests (for example linear regression, mutual information), SVM, or recursive elimination, and allowing a set comprising relevant variables, in particular the best or most relevant variables, to be obtained.

The expression "transition to an anomaly", within the meaning of the invention, may correspond to a moment when a metric or a plurality of metrics (related or not) present a risk or a result obtained by computing, of exceeding a predetermined threshold or indicative of a risk of failure or technical incident on the IT infrastructure.

The expression "technical incident" or the term "failure", within the meaning of the invention, corresponds to a slowdown or shutdown of at least part of the IT infrastructure and its applications. A technical incident can be caused by a network error, a process failure or a failure of part of the system.

The expression "computing infrastructure", within the meaning of the invention, corresponds to a set of computing structures (that is to say computing devices) capable of running an application or an application chain. The IT infrastructure can be one or more servers, computers, or include industrial controllers. Thus, the IT infrastructure may correspond to a set of elements including a processor, a communication interface and memory.

By "probe" or "computing probe" is meant, within the meaning of the invention, a device, software or process associated with equipment which makes it possible to carry out, manage and/or feed back to computer equipment measurements of the values of performance indicators such as system parameters. This can be broadly defined as resource usage values, application runtime parameter values, or resource operating state values. A probe according to the invention therefore also encompasses software or processes capable of generating application logs or event histories ("log file" in Anglo-Saxon terminology). In addition, probes can also be physical sensors such as temperature, humidity, water leakage, power consumption, motion, air conditioning, and smoke sensors.

The expression "performance indicator" or "metric", within the meaning of the invention, corresponds to a technical or functional property of one or more elements of an IT infrastructure or its environment representing the operating conditions or state of said IT infrastructure. In addition, a performance indicator can correspond to a combination of properties or mathematical transformations of properties. For example, a performance indicator can be the derivative of a property of an IT infrastructure element or a ratio between the properties of two IT infrastructure elements.

The expression "performance indicator value" or "metric value", within the meaning of the invention, corresponds to a measurement or calculation value of a technical or functional property of one or more elements of an IT infrastructure representing the operating state of said IT infrastructure.

The term "resource", within the meaning of the invention, corresponds to parameters, capacities or functions of computing devices allowing the operation of a system or an application process. A same computing device is usually associated with several resources. Similarly, a same resource can be shared between several application processes. A resource is usually associated with a unique identifier that can be used to identify it within an IT infrastructure. For example, the term "resource" may include: network disks characterized by performance indicators such as, for example, by their inputs/outputs, reading/writing on disks, memories characterized by a performance indicator such as the usage rate, a network characterized by its bandwidth, a processor characterized for example by its usage (in percent) or the occupancy rate of its caches, a random access memory characterized by the quantity allocated. By "resource usage" is meant the consumption of a resource, for example by a business application.

The term "learning", within the meaning of the invention, corresponds to a method designed to define a function f allowing a value Y to be calculated from a base of n labeled (X1 . . . n, Y1 . . . n) or unlabeled (X1 . . . n) observations. Learning can be said to be supervised when it is based on labeled observations and unsupervised when it is based on unlabeled observations. In the context of the present invention, learning is advantageously used for calibrating the method and thus adapting it to a particular computing infrastructure.

By "process", "calculate", "run", "determine", "display", "extract", "compare" or more broadly an "executable operation" is meant, within the meaning of the invention, an action performed by a device or a processor unless the context indicates otherwise. In this respect, operations refer to actions and/or processes in a data processing system, such as a computer system or electronic computing device, which manipulates and transforms data represented as physical (electronic) quantities in the memories of the computer system or other devices for storing, transmitting or displaying information. These operations may be based on applications or software.

The terms or expressions "application", "software", "program code", and "executable code" mean any expression, code or notation, of a set of instructions intended to cause a data processing to perform a particular function directly or indirectly (for example after a conversion operation into another code). Exemplary program codes may include, but are not limited to, a subprogram, a function, an executable application, a source code, an object code, a library and/or any other sequence of instructions designed for being performed on a computer system.

By "processor" is meant, within the meaning of the invention, at least one hardware circuit configured to perform operations according to instructions contained in a code. The hardware circuit may be an integrated circuit. Examples of a processor include, but are not limited to, a central processing unit, a graphics processor, an application-specific integrated circuit (ASIC), and a programmable logic circuit.

By "coupled" is meant, within the meaning of the invention, connected, directly or indirectly, with one or more intermediate elements. Two elements may be coupled mechanically, electrically or linked by a communication channel.

The expression "human-machine interface", within the meaning of the invention, corresponds to any element allowing a human being to communicate with a computer, in particular and without that list being exhaustive, a keyboard and means allowing in response to the commands entered on the keyboard to perform displays and optionally to select with the mouse or a touchpad items displayed on the screen. Another embodiment is a touch screen for selecting directly on the screen the elements touched by the finger or an object and optionally with the possibility of displaying a virtual keyboard.

The expression "connected object", within the meaning of the invention, corresponds to an electronic object connected, by a wired or wireless connection, to a data transport network, so that the connected object can share data with another connected object, a server, a fixed or mobile computer, an electronic tablet, a smartphone or any other connected device in a given network. In a manner known per se, such connected objects can be, for example, tablets, smart lighting devices, industrial tools or smartphones.

The expression "industrial production sensors", within the meaning of the invention, may correspond to connected objects. Industrial production sensors may in particular correspond to machine sensors, dedicated to the measurement of data relating to machines, preferably production machines such as industrial machines. Thus, industrial production sensors will be able to generate data expressed as a speed (for example revolutions per minute), rate, weight or any other units useful in an industrial context. Industrial production sensors can also be environmental sensors capable of measuring temperature, pressure, humidity, for example. In particular, industrial production sensors may correspond to computing probes.

The expression "industrial process", within the meaning of the invention, may correspond to a process for the production of consumer goods, which may be, for example, electronic objects, mechanical objects, foodstuffs, or pharmaceuticals or phytopharmaceuticals. In addition, an industrial process can be controlled via an IT infrastructure. Thus, monitoring an industrial process may correspond to monitoring an IT infrastructure.

By "computing device" is meant any computing device or computing infrastructure comprising one or more hardware and/or software resources configured to send and/or receive data streams and to process them. The computing device can be a computing server.

By "Data Providers" is meant any sensors (such as industrial production sensors), probes (such as computing probes) or computer programs capable of generating industrial process monitoring data. They can also correspond to computing devices such as servers that manage data generated by sensors, probes or computer programs.

In the following description, the same references are used to designate the same elements.

As mentioned, machine learning is a major part of the fourth industrial revolution. Thus, industrial processes are more and more frequently improved through the integration of artificial intelligence or, more specifically, machine learning models capable of addressing technical problems as varied as there are industrial processes.

In particular, machine learning is based on a multitude of data that can come from several different sources and can therefore be highly heterogeneous. Thus, with the methods of the prior art, it is common for a team of data scientists to be trained in data processing and set up data processing processes. Once this data is processed, it allows the training of a learning model. Nevertheless, when data sources are diverse and vary over time, the prior art methods are not reactive and can cause shutdowns of industrial processes. Indeed, when machine learning is used for industrial process control, any change in variables not taken into account by the learning model can lead to a decrease in the prediction performance thereof and thus affect the responsiveness of control processes or worse a lack of sensitivity.

This can lead to risks for the industrial processes being controlled but also for the people working in contact with these industrial processes. To avoid these technical problems of shutdown of industrial processes, the inventors developed new automated processes for continuous analysis of the learning model used.

In particular, as will be detailed below, the inventors developed a system and method for selecting a learning model. Advantageously, a system and a method for selecting a learning model according to the invention will make it possible to constantly evaluate the learning model used, adapt it or replace it with a learning model more capable of interpreting a dataset.

For this purpose, the inventors therefore proposed a method for selecting a learning model for evaluating the prediction and classification performance of the commonly used learning model and the selection of a learning model more relevant to the interpretation of a dataset under study.

In particular, the inventors propose a method and a system for dynamically selecting a learning model adapted to a dataset. Indeed, within a complex system (for example an industrial process, a set of servers, applications or equipment within a data center), some anomalies can cause serious operating problems, for example through a cascade effect. However, a robust and adaptable learning model is needed to avoid degradation of the prediction of the learning model that prevents the detection of future breakdowns or anomalies.

The invention therefore relates to a method 100 for selecting a learning model defined in particular by parameters and hyperparameters from among a plurality of learning models. In particular, the dataset can be implemented within a machine learning model that can be used for monitoring an industrial process.

In particular, as shown in FIG. 1, the method 100 for selecting a learning model comprises a step of evaluating 110 the prediction performance of each learning model, an evaluation processing 120 including a step of evaluating 121 a classification, a step of selecting 130 a model, a step of varying 140 the hyperparameter values, a step of selecting 170 a model.

Such a method 100 for selecting a learning model is advantageously implemented by a computing device comprising a processing unit operably coupled to a non-transitory computer readable storage medium, on which a model selection module and a model repository are stored. The model repository may also be stored on a dedicated server and be accessible via a wired communication bus or via a communication network.

In addition, the method 100 for selecting a learning model will be able to continuously receive a dataset, preferably preprocessed, in order to evaluate the machine learning model commonly used for monitoring an industrial process. Preferably, in the context of a method according to the invention, the transmission of the dataset, preferably preprocessed, to the machine learning model is in real time.

Furthermore, in the context of a method according to the invention, the evaluation of the performance of the learning model is preferably carried out continuously. Continuous evaluation corresponds, for example, to measurements or processing carried out at a frequency less than or equal to one hour, preferably less than or equal to 30 minutes, more preferably less than or equal to five minutes, for example less than or equal to ten seconds. The model selection module is configured to determine a prediction model suitable for a dataset submitted thereto and including variables or parameters. Such variables or parameters may, for example, correspond to performance indicators of a high performance computing infrastructure such as: resource usage, event history, software errors, hardware errors, response times, application traffic, service load, network traffic, file modifications, number of users of a service, number of sessions, number of processes, temperature values, humidity values, and power consumption. In particular, performance indicators may include: network throughput, network latency, CPU usage, memory usage, server response time, number of slow pages and/or number of transactions. The values of the performance indicators constituting the dataset received by the computing device and used by the prediction model can be generated by computing probes dedicated to the monitoring of performance indicators of an IT infrastructure. Thus, the method according to the invention finds its application in particular in the context of the implementation of a model for predicting an anomaly, from performance indicator values generated by probes dedicated to the monitoring of performance indicators of the IT infrastructure. More specifically, such a method will allow the prediction model to be adapted by constantly evaluating its prediction and classification capabilities and readjusting them in order to maintain a high performance prediction model.

The model repository corresponds to a database comprising a plurality of supervised and unsupervised machine learning algorithms. To allow the implementation of these machine learning algorithms, the computing device can integrate libraries such as for example Scikit-learn or SciPy from Python.

Thus, the model repository can comprise unsupervised algorithms such as K-Means, "DBSCAN" for density-based spatial clustering of applications with noise, or hierarchical clustering.

The model repository can also comprise supervised algorithms such as multiple regression (Ordinary Least Square, Lasso, Ridge, ElasticNet, Logistic Regression), neural network: Multi-Layer Perceptron (MLP), SVM for "Support Vector Machine", AdaBoost, Random Forest, or K-nearest neighbor.

The computing device according to the invention may advantageously be adapted to be integrated into a system of high performance computers or more generally into any system implementing a prediction model based on supervised or unsupervised learning techniques.

One of the main challenges in using a prediction model is its ability to anticipate the occurrence of an anomaly in a system. In particular, in the context of high performance computing systems, it is necessary to be able to anticipate the occurrence of breakdowns or a decline in the quality of the services provided. Of course, such computer systems are constantly evolving, new hardware (that is to say computer resources) or software bricks are often added. In order to provide a prediction model that is as relevant as possible, a method 100 for selecting a learning model according to the invention comprises a step of evaluating 110 the prediction performance of each learning model, by prediction performance indicators.

To do this, the evaluation step 110 can implement different methods such as cross-validation, which consists in creating a training sample, in particular from a training dataset including, for example, performance indicators of a high performance computing infrastructure on which the model will be built. The training dataset will advantageously comprise performance indicators that characterize "normal" high performance computing infrastructure behavior that can be associated with the operation of the infrastructure in which none of the performance indicators are anomalous. A test dataset is then used, in particular a dataset comprising performance indicators, on which the prediction model will be tested.

The evaluation step 110 can thus correspond to:
the "LOOCV" (for Leave-One-Out Cross-Validation) method which consists in outputting an observation "i" from the whole dataset and calculating the model on the remaining m−1 data. This validation model is used to predict i and is used to calculate the prediction error. The process is repeated for all values of i=1, . . . , m. The m prediction errors are used to evaluate the performance of the model.
The K-Fold method: the data are randomly divided into k subsamples of equal size, one of which is used for model prediction and the remaining k−1 for model estimation. The process is repeated k times.

To evaluate the quality of the model and its prediction performance, the evaluation step 110 allows the determination of model prediction performance indicators.

By way of non-limiting examples, the evaluation step 110 may consist in determining performance indicators related to the regression model implemented by the prediction model, such as:
The mean absolute error (MAE). The absolute deviation of an element in a dataset is the absolute difference between that element and a given point. As for the mean absolute deviation of a set, it is the mean (or expected value) of the absolute deviations from the mean.
The root mean squared error (RMSE). It allows the residuals between the values predicted and observed by a model or a classifier to be measured. The root mean square error represents the square root of the second sampling time of the differences between predicted and observed values or the root mean square of these differences.
The coefficient of determination R2. This is a measurement of the quality of the linear regression prediction.

Thus, it is possible to establish the suitability of the prediction model used according to the specified parameters, such as the performance indicators of a computer system such as the high performance computing infrastructure mentioned above.

In order to evaluate the prediction and classification capability of the prediction model used, the method 100 comprises an evaluation processing 120 including a step of evaluating 121 a classification, by the model selection module, for providing, for each learning model, at least one classification value.

Indeed, for classification, prediction models are evaluated according to the score obtained from their confusion matrix (in particular from their F score), with this matrix evaluating their capacity to predict and classify on the dataset used.

The model selection module is thus configured, like a class 2 classifier, to provide two types of response regarding the elements of the dataset to be predicted. The response provided by the model selection module can be evaluated from the dataset of known elements containing the expected responses.

Thus, the confusion matrix comprises for each element of the dataset to be predicted:
- The predicted response (positive or negative),
- The observed response (positive or negative),
- The number of correctly predicted responses (true positive "TP" or true negative "TN"),
- The number of falsely predicted responses (false positive "FP" or false negative "FN").

From this confusion matrix, the classification evaluation step 121 is configured to determine at least one classification value such as:
- the precision that reflects the good classification rate: precision=TP/(TP+FP).
- the recall or sensitivity or True Positive Rate TPR, which is the proportion of items that are correctly classified with respect to the number of items in the class to be predicted: TPR=TP/(TP+FN).
- the False Positive Rate: FPR=FP/(FP+TN).
- the relevance score calculated from the harmonic mean of precision and recall. The score is also referred to as the F score, the precision and recall are weighted equally: F score=2*(precision recall)/(precision+recall).

In addition, in order to estimate the reliability of the model selection module, more specifically of the classification function of the model selection module, the evaluation processing 120 may include a step of evaluating 122 the classifier for generating a reliability indicator. For this purpose, the reliability of the model selection module can be evaluated through relevance thresholds. A relevance threshold can be defined for each response predicted by the model selection module (positive and negative) in the confusion matrix.

Thus, the F score determined for each predicted response can be compared to a predetermined relevance threshold. In particular, if the F score is above the predetermined relevance threshold, the more the numbers of true and false positives increase, the more reliable the model selection module can be considered in its predictive ability.

In the case of a binary classifier, reliability can also be represented by means of a graph called an ROC (for "Receiver Operating Characteristic" in Anglo-Saxon terminology) curve. The step of evaluating 122 the classifier can thus allow the determination of the true positive rate (TPR) by generating an ROC curve representing TPR as a function of FPR for several relevance threshold values. If "s" is the classification threshold, then this is equivalent to calculating the couples (FPR(s), TPR(s)), using the equations below:

$$TPR(s) = \frac{TP(s)}{TP(s) + FN(s)} = \int_s^\infty f_1(x) \cdot dx$$

$$FPR(s) = \frac{TP(s)}{FP(s) + TN(s)} = \int_s^\infty f_0(x) \cdot dx$$

where $f_0(x)$ (respectively $f_1(x)$) is the probability density when the given answer is considered false (respectively right).

In addition, the evaluation processing 120 may include a step of comparing 123 the prediction performance indicators or classification values determined in the steps of evaluating 110 the prediction performance and/or of evaluating 121 the classification and evaluating 122 the classifier, respectively.

Advantageously, the predetermined prediction value thresholds may include one or more prediction thresholds for the one or more prediction performance indicators determined in the step of evaluating 110 the prediction performance and one or more prediction thresholds for the one or more classification values determined in the step of evaluating 121 the classification and evaluating 122 the classifier.

When the step of comparing 123 the prediction performance indicators or classification values determines that the respective values of the prediction performance indicators and/or classification values are less 123-NOK than the predetermined prediction threshold values, the prediction or learning model is considered irrelevant to the interpretation of the dataset on which the prediction model is tested (that is to say in particular the dataset comprising performance indicators of a computer system).

In this case, a new prediction model is selected and the dataset is used to test said new prediction model, so the step of evaluating 110 the prediction performance is repeated.

When the step of comparing 123 the performance indicators and/or classification values determines that the respective values of the performance indicators and/or classification values are greater 123-OK than predetermined prediction threshold values, the prediction or learning model is considered relevant to the interpretation of the dataset on which the prediction model is tested.

Once the step of evaluating 110 the prediction performance and the evaluation processing 120 have been implemented for all learning models stored in the model repository, a method 100 according to the invention comprises implementing a step of selecting 130 a model, the performance value and classification value of which are greater than first predetermined threshold values.

Indeed, as mentioned above, only those prediction models should be selected that are likely to allow a faithful interpretation of the dataset, thus only those prediction models with performance indicators and/or classification values above first predetermined threshold values are selected.

In order to maximize the prediction capabilities of the prediction model, a method 100 according to the invention comprises a step of varying 140 hyperparameter values, from hyperparameter optimization indicators.

In the context of machine learning, hyperparameters are parameters, the values of which are set before the learning process begins. Hyperparameters are distinguished from other parameters, such as performance indicators of a computer system in the dataset, the values of which are calculated during learning. For example, the number of layers in a multilayer perceptron is a hyperparameter, but the weights and biases of the neural network are parameters calculated during learning.

Indeed, it is necessary to determine the hyperparameters allowing the best result, that is to say the most accurate prediction, to be generated.

For this purpose, the step for varying 140 the hyperparameter values can be implemented when the hyperparameter value is below the predefined threshold value. The hyperparameter value can correspond to a performance measurement for each hyperparameter, such as the cost function to be optimized.

Advantageously, the step of varying 140 the hyperparameter values can comprise the implementation of:
- hyperparametric optimization by parameter grid search or sweep, or
- a hyperparametric optimization by random search, or
- a sequential model-based optimization 200.

Hyperparametric optimization by parameter grid search or sweep, better known under the Anglo-Saxon terminology "Grid Search", simply consists of an exhaustive search through a specified subset of the hyperparameter space of a learning algorithm. For each of the points in the space, a performance measurement is carried out. The point giving the best performance is chosen to be the one that represents the most relevant hyperparameters, to be selected.

For example, an SVM (support vector machine) algorithm with a Gaussian kernel has at least two hyperparameters to be optimized: a control constant and a kernel hyperparameter, which are continuous hyperparameters.

Grid Search optimization thus calculates the performance of the SVM algorithm for each pair from the Cartesian product of two subsets. Finally, the method outputs the parameters that have reached the highest score.

One of the major drawbacks of this method is the dimensioning of the search space. Indeed, when the number of hyperparameters increases, the number of elements in the search "grid" increases exponentially, which considerably increases the computing time required to evaluate all the applicable metrics per prediction model for regression, on the one hand, and for classification, on the other hand.

Hyperparametric optimization by random search, better known under the Anglo-Saxon terminology "Random Search", consists in a random search allowing the parameters to be sampled a fixed number of times. This is often because it turns out that some hyperparameters do not significantly influence the loss of performance.

Sequential model-based optimization 200, better known under the Anglo-Saxon terminology "Sequential Model-Based Optimization", uses previous observations of the cost function f to determine the next (optimum) point to sample the cost function.

Preferably, sequential model-based optimization 200 may comprise the implementation of a Bayesian algorithm including a step 210 of defining a search space.

The search area includes all hyperparameters related to the dataset to be tested.

Then, sequential model-based optimization 200 comprises a step of optimizing 220 the search space comprising characterizing each data of the search space, including the hyperparameters, by values.

Bayesian optimization works by constructing a posterior distribution of functions (Gaussian process) that best describes the function to be optimized. As the number of observations increases, the posterior distribution improves and the sequential model-based optimization 200 becomes more reliable in terms of the spatial regions of parameters worth exploring and those that are not.

The step of optimizing 220 the search space implements a Gaussian process fitted to the known samples (points previously explored), and is a generalization of the Gaussian distribution to a distribution with respect to the functions, instead of random variables. The Gaussian process is completely specified by a mean function and a covariance function. A Gaussian process outputs the mean and variance of a normal distribution for any point x in the domain of f. It induces an a posteriori probability on the cost function, which allows the belief on f to be updated after each calculation of the latter on the most optimum point still to be found by relying on an acquisition function.

Sequential model-based optimization 200 thus comprises a step of associating 230 each data item in the optimized search space with an optimum value according to an acquisition function. Indeed, to find the best future point to evaluate f, the point that maximizes an acquisition function is selected. This function describes the usefulness for all values in the f domain (in this case, the hyperparameters). The values with the highest utility will be selected to measure the next value of the cost function f.

Such an acquisition function can be a function of the expected improvement.

Starting from the function of the expected improvement, the sequential model-based optimization 200 comprises a step of determining 240 an optimum data item for which the acquisition function is maximized.

The function of the expected improvement is defined as:

$$EI(x) = \mathbb{E}[\max\{0, f(x) - f(\hat{x})\}]$$

where $\hat{x}$ is the optimum current point. Maximizing this quantity means finding the expected point that improves the function f.

The expectation can be calculated under a Gaussian process model using integration by parts:

$$\begin{cases} (\mu(x) - f(\hat{x}))\Phi(Z) + \sigma(x)\phi(Z) & \text{if } \sigma(x) > 0 \\ 0 & \text{if } \sigma(x) = 0 \end{cases}$$

where $$Z = \frac{\mu(x) - f(\hat{x})}{\sigma(x)};$$

$\phi(Z)$ and $\varphi(Z)$ represent the distribution function and probability density of the normal distribution, respectively.

It can therefore be deduced that the latter function will have higher values when:
- The a posteriori value $\mu(x)$ is greater than the best current value $f(\hat{x})$;
- The uncertainty $\sigma(x)$ around x is important.

Thus, sequential model-based optimization 200 comprises a step of calculating 250 a new data item from the optimum data item and the maximized acquisition function, a step of implementing 260 the optimized search space comprising the newly calculated data item, and selecting 270 the optimized values of the parameter values associated with each transformation function based on the optimized data when the search space is implemented.

A method 100 for selecting a learning model may also comprise a step of simultaneously comparing 150 the analysis results of the different models, including the hyperparameter value and more particularly the performance measurement for each of the hyperparameters such as the cost function to be optimized.

Advantageously, the step of simultaneously comparing 150 the analysis results of the different models can consist in comparing the cost function to be optimized of each of the hyperparameters with a threshold value, if said cost function to be optimized is greater 150-OK than the threshold value, then the corresponding prediction model is considered relevant to the interpretation of the dataset on which the prediction model is tested (that is to say in particular the dataset comprising performance indicators of a computer system).

When the step of simultaneously comparing 150 the analysis results of the different models determines that the cost function to be optimized is less 150-NOK than the threshold value, the prediction or learning model is considered irrelevant to the interpretation of the dataset on which the prediction model is tested.

A method 100 for selecting a learning model may further comprise a step of electing 160 the best algorithm and submitting it to the user.

Finally, a method 100 for selecting a learning model according to the invention comprises a step of selecting 170 a model when the prediction performance value and the classification value are greater than predetermined second threshold values and the hyperparameter value is greater than a predetermined threshold value. This thus allows the selection of the prediction model that best fits the provided dataset while including optimized hyperparameters.

The invention claimed is:

1. A computer-implemented method for continuously evaluating a learning model used for monitoring an industrial process involving an IT computing infrastructure and predicting the occurrence of an anomaly, said learning model being one of a plurality of learning models, said learning models being defined by parameters and hyperparameters, said parameters of said learning models having been learnt during a training process based on training datasets comprising data measurements related to industrial machines involved in said industrial process, said data measurements comprising performance indicators of said IT computing infrastructure, received from industrial sensors, comprising computing probes and physical sensors selected from the group consisting of a temperature sensor, a humidity sensor and a power consumer sensor, for training the learning models to predict anomalies in the industrial process, said performance indicators being selected from the group consisting of resource usage, event history, software errors, hardware errors, response times, application traffic, service load, network traffic, file modifications, number of users of a service, number of sessions, number of processes, temperature values, humidity values, power consumption, CPU usage, memory usage, server response time, number of slow pages and number of transactions, said hyperparameters having values that are set before the learning process begins, said method being implemented by a model selection module of a computing device, said computing device further comprising a processor operably coupled to a non-transitory computer readable storage medium storing a model selection module and a model repository including a plurality of series of instructions each corresponding to one learning model of said plurality of learning models and each including said parameters and hyperparameters, said processor being configured to execute said model selection module and to run said plurality of learning models, said method comprising:

receiving an input dataset used by the learning model being evaluated, said input dataset comprising data measurements related to said industrial machines, from said industrial sensors, and storing said input dataset in said memory;

evaluating prediction performance of each learning model of said plurality of learning models on the input dataset, by determining model prediction performance indicators;

an evaluation processing including a step of evaluating a classification, for providing, for each learning model of said plurality of learning models, at least one classification performance value;

pre-selecting a learning model of said plurality of learning models, a prediction performance value and the classification value of which are greater than first predetermined threshold values;

varying hyperparameters of the selected learning model, based on hyperparameter optimization indicators, to produce optimized hyperparameters that optimize a cost function representative of a most accurate prediction of behavior of the industrial process;

selecting the pre-selected learning model associated with the optimized hyperparameters as suitable to process the input data set, when a prediction performance value and the classification value are greater than predetermined second threshold values and, for each optimized hyperparameter, the cost function of the selected model is greater than a predetermined performance threshold value; and submitting the selected learning model associated with the optimized hyperparameters to a user in order to adapt or replace the learning model being evaluated.

2. The method according to claim 1, wherein varying the hyperparameters is implemented when the hyperparameter performance value are below the predetermined threshold values, said varying the hyperparameters comprising the implementation of:

a hyperparametric optimization by parameter grid search or sweep;

a hyperparametric optimization by random search; or a sequential model-based optimization.

3. The method according to claim 1, wherein varying the hyperparameters is implemented when the hyperparameter performance values are lower than the predetermined threshold values, said varying the hyperparameters comprising a sequential model-based optimization, said sequential model-based optimization comprises implementing a Bayesian algorithm including:

defining a search space;

optimizing the search space comprising characterizing each data item of the search space, including the hyperparameters, by values;

associating with each data item of the optimized search space an optimum value according to an acquisition function;

determining an optimum data item for which the acquisition function is maximized;

calculation of a new data item from the optimum data item and the maximized acquisition function;

implementing the optimized search space comprising the newly calculated data item; and selecting optimized values of the hyperparameters associated with each transformation function as a function of the optimum data when the search space is implemented.

4. The method according to claim 1, further comprising simultaneously comparing analysis results of different models among the plurality of learning models.

5. The method according to claim 1, further comprising electing a best algorithm and submitting it to the user.

6. The method according to claim 1, wherein the evaluation processing further comprises evaluating a classifier for generating a reliability indicator.

7. The method according to claim 1, further comprising automatically generating models for the problem under study.

8. The method according to claim 1, wherein the parameters are defined from a dataset issued by data providers having industrial production sensors, and wherein the selected learning model is trained for monitoring an industrial process.

9. The method according to claim 8, wherein the industrial production sensors include: connected objects, machine sensors, environmental sensors and/or computing probes.

10. The method according to claim 8, wherein the industrial process is selected from: an agri-food production process, a manufacturing production process, a chemical synthesis process, a packaging process or a process for monitoring an IT infrastructure.

11. The method according to claim 8, wherein said industrial process monitoring comprises industrial process security monitoring including predictive maintenance, failure detection, fraud detection, and/or cyber-attack detection.

12. A non-transitory recording medium on which a program comprising instructions is recorded, which, when executed by a computing device, cause a method for continuously evaluating a learning model according to claim 1 to be implemented.

13. A system for continuously evaluating a learning model used for monitoring an industrial process involving an IT computing infrastructure and predicting the occurrence of an anomaly, said learning model being one of a plurality of learning models, said learning models being defined by parameters and hyperparameters, said parameters of said learning models having been learnt during a learning process based on training datasets comprising data measurements related to industrial machines involved in said industrial process, said data measurements comprising performance indicators of said IT computing infrastructure, said data measurements being received from industrial sensors comprising computing probes and physical sensors selected from the group consisting of a temperature sensor, a humidity sensor and a power consumption sensor, for training said learning models to predict anomalies in the industrial process, said performance indicators being selected from the group consisting of resource usage, event history, software errors hardware errors, response times, application traffic, service load, network traffic, file modifications, number of users of a service, number of sessions, number of processes, temperature values, humidity values, power consumption, CPU usage, memory usage, server response time, number of slow pages and number of transactions, said hyperparameters having values that are set before the learning process begins, said system comprising said plurality of learning models said hyperparameters and parameters, said system comprising a computing device comprising a processor and a non-transitory storage medium comprising a model selection module and a model repository including a plurality of series of instructions each corresponding to a learning model of one of said plurality of learning models, each including said parameters and hyperparameters, said processor being configured to execute said model selection module and to run said plurality of learning models, said computing device being configured to:
 receive an input dataset used by the learning model being evaluated, said input dataset comprising data measurements related to said industrial machines, from said industrial sensors, and storing said input dataset in a memory;
 evaluate prediction performance of each learning model of said plurality of learning models on the input dataset, by prediction performance indicators;
 evaluate a classification, and provide, for each learning model of said plurality of learning models, at least one classification performance value;
 pre-select a said learning model, a prediction performance value and the classification value of which are greater than first predetermined threshold values;
 vary hyperparameters of the pre-selected learning model, based on hyperparameter optimization indicators, to produce optimized hyperparameters that optimize a cost function representative of a most accurate prediction of behavior of the industrial process;
 select the pre-selected learning model associated with the optimized hyperparameters as suitable to process the input data set, when the prediction performance value and classification value are greater than predetermined second threshold values and the for each associated optimized hyperparameter is greater than a predetermined performance threshold value, the cost function of the selected model is greater than a predetermined performance threshold value; and
 submit the selected learning model associated with the optimized hyperparameters to a user in order to adapt or replace the learning model being evaluated.

* * * * *